Aug. 28, 1945.　　A. M. MacCALLUM ET AL　　2,383,663
GYRO CAGING MECHANISM
Filed Feb. 3, 1943　　3 Sheets-Sheet 1

INVENTORS
Alan M. MacCallum
Paul A. Noxon
ATTORNEY

Aug. 28, 1945.   A. M. MacCALLUM ET AL   2,383,663
GYRO CAGING MECHANISM
Filed Feb. 3, 1943   3 Sheets-Sheet 2
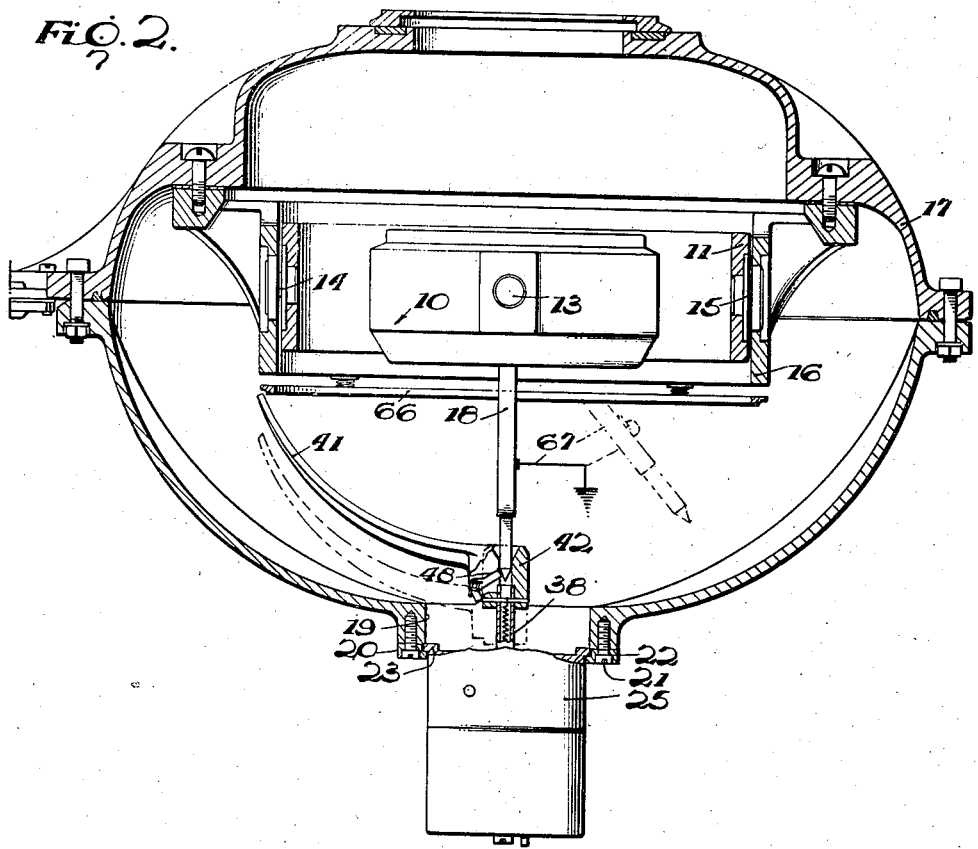
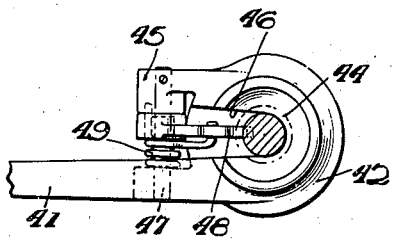
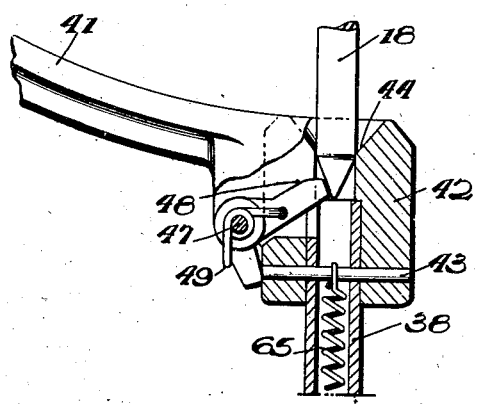
INVENTORS
Alan M. MacCallum.
Paul A. Noxon.
BY
[signature] ATTORNEY

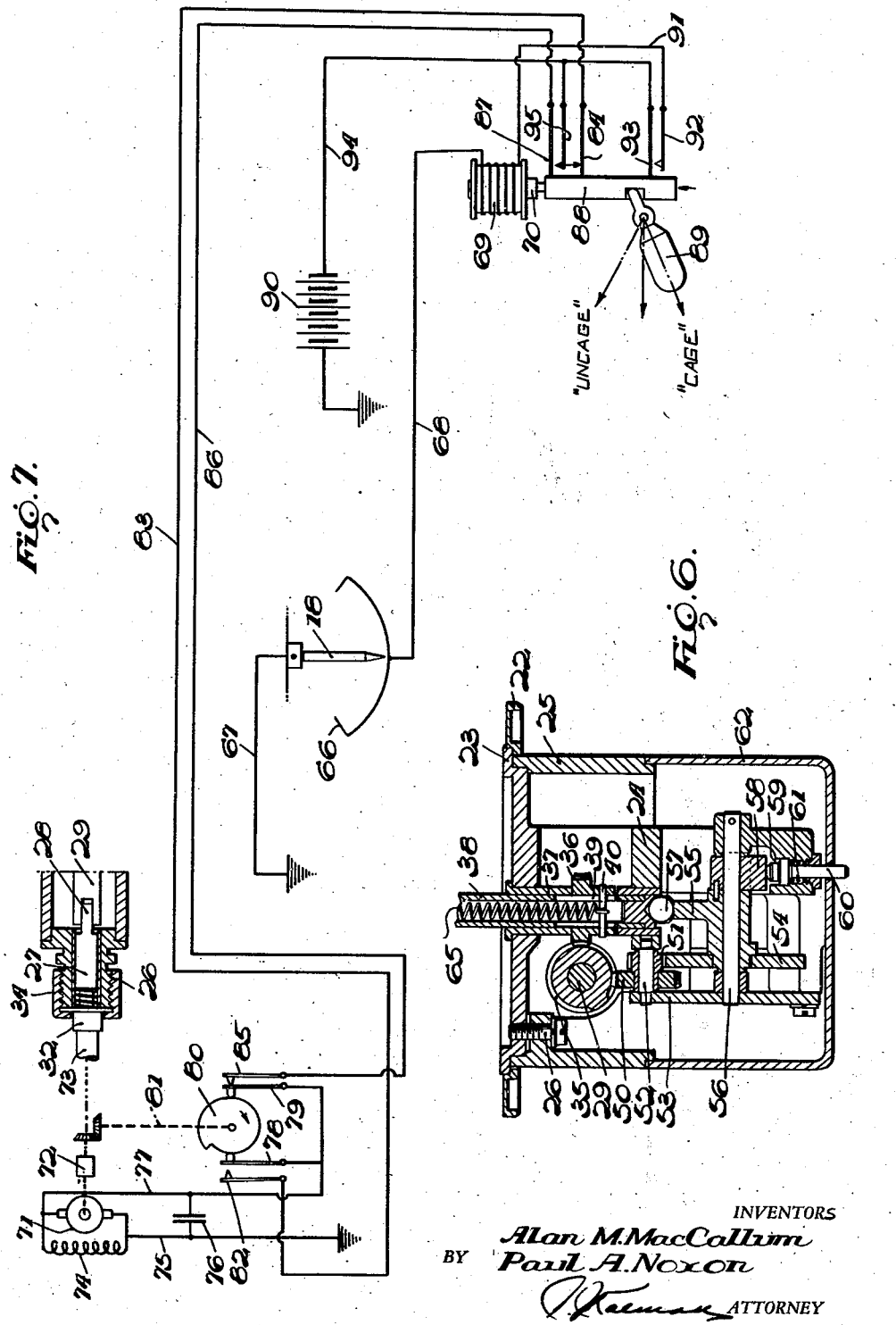

Patented Aug. 28, 1945

2,383,663

UNITED STATES PATENT OFFICE 2,383,663

GYRO CAGING MECHANISM

Alan M. MacCallum, Maywood, and Paul A. Noxon, Tenafly, N. J., assignors to Bendix Aviation Corporation, Bendix, N. J., a corporation of Delaware Application February 3, 1943, Serial No. 474,592

11 Claims. (Cl. 74—5)

This invention relates to novel apparatus for automatically caging and centralizing artificial horizons, gyro-verticals, directional gyros, etc., and the present application constitutes an improvement over the arrangement of U. S. Patent No. 2,369,845 issued February 20, 1945.

As pointed out in the parent application it is desirable, under certain flight conditions, to cage and center spinning gyroscopes where the latter are used as navigational instruments or where they constitute a part of an automatic pilot. Under certain given conditions the manual and remote caging apparatus of the above-identified parent application is highly desirable but under other given conditions it may be desired to have automatically operated caging devices which will relieve the pilot of the necessity of manually operating the caging mechanism prior to the time when the gyro might otherwise become injured.

An object of the present invention, therefore, is to provide novel caging means for gyroscopes which is simple in design and automatic in operation.

Another object of the invention is to provide a novel artificial horizon or gyro vertical having caging means therefor which act automatically in response to a certain predetermined tilt of the gyro rotor relative to its support to precess the gyro to a central and locked position.

A further object of the invention is to provide a novel artificial horizon or gyro vertical which may be used as the controlling element of an automatic pilot so that upon a predetermined bank or pitch of an aircraft, embodying such pilot, the gyro will become automatically centered and caged.

The above and further objects and novel features of the invention will appear more fully from the following detailed description when the same is read in connection with the accompanying drawings. It is to be expressly understood, however, that the drawings are for purposes of illustration only and are not intended as a definition of the limits of the invention.

In the drawings wherein like reference characters refer to like parts throughout the several views, Figure 1 is a top plan view, partially in section, of one form of a gyroscopic device embodying the subject matter of the present invention;

Figure 2 is a vertical section view taken substantially along line 2—2 of Figure 1;

Figure 3 is a fragmentary side elevation view, partially in section, of a portion of the caging mechanism of the present invention;

Figure 4 is a fragmentary and top plan view of the structure of Figure 3;

Figure 6 is a vertical section view taken substantially along line 6—6 of Figure 5; and, Figure 7 is a diagrammatic illustration of the automatic caging circuit of the present invention.

Figure 1:
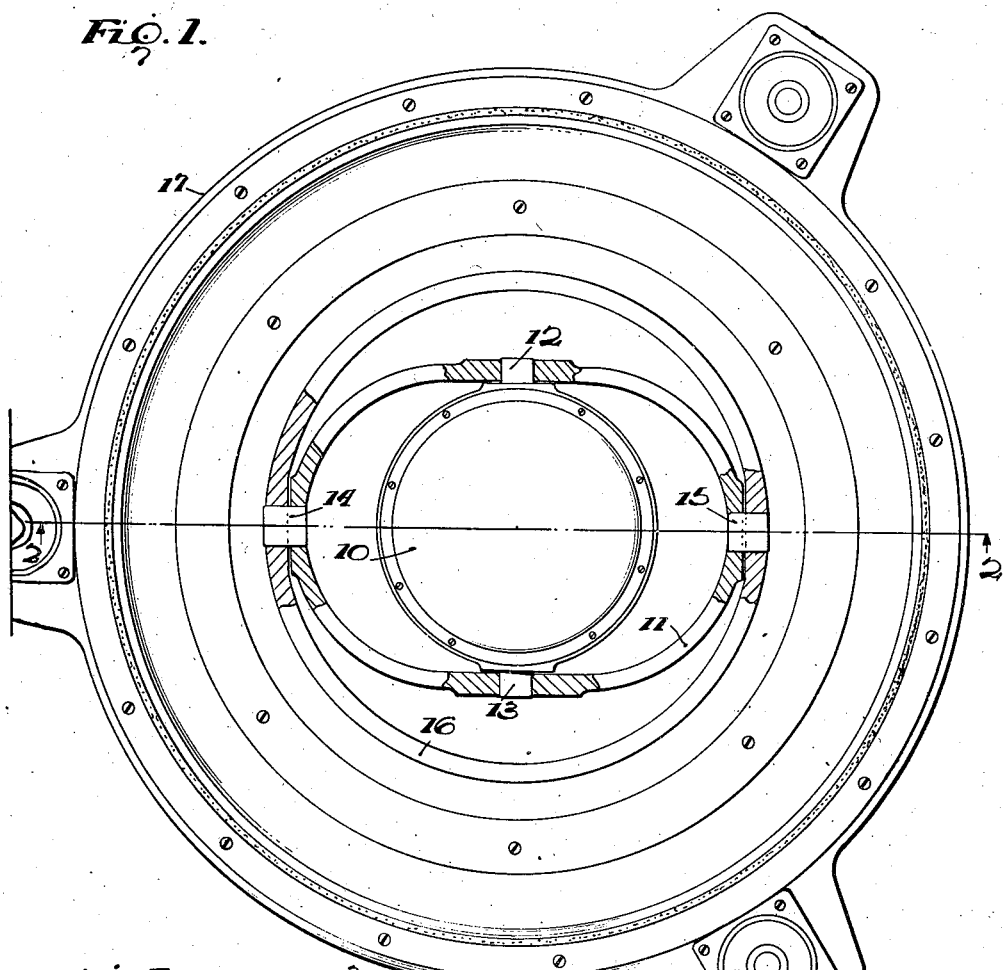

The novel automatic centering and caging apparatus of the present invention is illustrated in Figure 2 as applied to an artificial horizon gyro having a rotor (not shown), adapted to be driven pneumatically or electrically, mounted within a rotor bearing casing 10 for spinning about a normally vertical axis. The rotor bearing casing is mounted for oscillation about a horizontal axis within a gimbal ring 11 (better shown in Figure 1) by way of suitable trunnions 12 and 13 fastened to casing 10. The gimbal ring, in turn, is mounted for oscillation about a second horizontal axis by way of outer trunnions 14 and 15 which rotatably support the gimbal and rotor casing within an annular bracket 16, the latter being rigidly fastened within an instrument housing 17 which is adapted for mounting upon an aircraft or other mobile vehicle.

The foregoing suspension provides the rotor with three degrees of freedom, and the spin axis thereof may be maintained vertical by way of well known erecting means such as, for example, that shown in the United States Patent to Robert Alkan, No. 2,159,118 issued May 23, 1939.

A caging pin 18 is secured to the bottom of rotor bearing casing 10 and projects downwardly therefrom with its longitudinal axis arranged to be at all times coaxial with the rotor spin axis. As shown in Figure 2, the base of housing 17 is provided with an annular flange 19 having an opening therein for mounting the caging mechanism, shown and claimed in the above-mentioned parent application, in a manner to cooperate with caging pin 18 whereby the gyroscope will be caged and centralized.

Annular flange 19 of instrument housing 17 has secured thereto, as shown in Figure 2, by suitable means such as screws 20, 21, a ring 22 formed with an internal flange upon which rests a plate 23 of an inner casing 24, the latter supporting the operative mechanism of the caging device (see Figure 6). Enclosing the inner casing is a cylindrical shell 25 which is secured by means, such as screws 26, to plate 23 of the inner casing. Shell 25 has secured thereto or formed integrally therewith an apertured boss 26a (Figure 5) which receives a shaft 27 provided with a finger 28 adapted for cooperation with the bifurcated end of a shaft 29 journalled for rotation within bearing arms 30 and 31 carried by inner casing 24.

At its free end shaft 27 is provided with a sleeve 32 having a flange 33 abutting boss 26a and held securely thereagainst by means of a lock nut 34 cooperating with the outer periphery of boss 26, the latter being screw threaded for this purpose.

A worm 35 is pinned to shaft 29 for rotation therewith and meshes with a worm gear 36 which is secured to a hollow bushing 37 rotatably mounted within plate 23 of the inner casing. Bushing 37 slidably receives therein a hollow shaft 38 which is provided, at its lower end, with a transverse slot 39 for reception of a transverse pin 40 secured to worm gear 36 and, at its upper end, with a curved finger 41 formed integrally with or secured to a collar 42, the latter being fastened to shaft 38 by means of a pin 43 (Figure 3).

Collar 42 is provided with a central aperture 44 and is formed with an arm 45 (Figure 4) which, together with finger 41, defines a relatively narrow passageway 46 through which rotor pin 18 travels to a central position as will presently appear. A transverse shaft 47 is journalled within arm 45 and finger 41 and supports thereon a locking detent member 48 which is normally urged to the position of Figure 3 by means of a spring 49, the latter being anchored to the detent at one end and to arm 45 at its other end.

Because of the pin and slot connection between shaft 38 and worm gear 36, the former is caused to rotate when the latter is actuated by worm wheel 35. In addition to driving worm gear 36, worm 35 also meshes with a second worm gear 50 which, together with a pinion 51, is secured to a shaft 52, the latter being journalled at one end in casing 24 and at its other end in a side plate 53 which is fastened to the inner casing (see Figure 6).

Pinion 51 is in driving engagement with a large gear 54 which is fixed to a relatively large cam 55, the latter being splined to a shaft 56 which, at one end, is mounted in plate 53 and, at its other end, in inner casing 24. Cam 55 is arranged beneath the lower end of shaft 38 and, if desired, a bearing surface in the form of a ball 57 may be spun into the bottom of the shaft and thus provide a positive engagement between the shaft and the cam surface when a caging operation is initiated.

Figure 5:
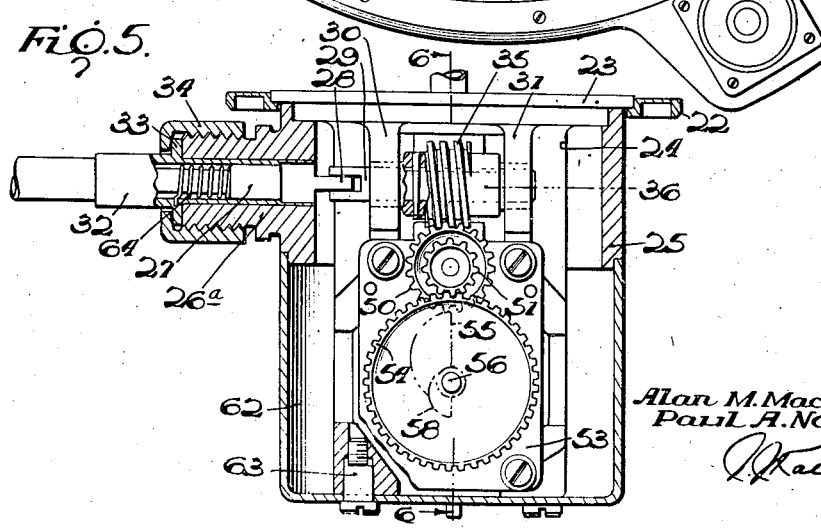
Figure 5 is an enlarged side elevation view, partially in section, of the operating mechanism of the novel caging device.

A relatively smaller cam 58 is mounted on shaft 56 for movement with cam 55 and is arranged adjacent a cylinder 59 formed within a part of inner casing 24. Cylinder 59 receives a plunger 60 which is normally urged upwardly against cam 58 by virtue of a spring 61. The above described cams and their actuating gears are enclosed within a cup-shaped housing 62 which is secured to the base of inner casing 24 by any suitable means such as screws 63. Housing 62, furthermore, is provided with an aperture aligned with cylinder 59 so that, when the gyro has been caged, plunger 60 will project beneath the housing as illustrated in Figures 5 and 6.

By actuating worm wheel 35 by the novel and automatic apparatus of the present invention, to be described hereinafter, not only is shaft 38 rotated through worm gear 36 and the pin and slot connection therebetween but the shaft is also displaced longitudinally toward the rotor bearing casing 10 by reason of the fact that cam 55 is actuated through worm gear 50, pinion 51 and gear 54. Thus, finger 41, carried by shaft 38, is rotated and displaced longitudinally relative to the rotor casing. In Figure 5, cam 55 is shown in its maximum position where shaft 38 and finger 41 have been raised to a caging position and simultaneously therewith cam 58 has lowered plunger 60 to its lowermost position. Upon continued rotation of worm wheel 35, the high point of cam 55 will pass to the left, as viewed in Figure 5, and shaft 38, under the influence of a spring 65 anchored at one end to pin 43 and at its other end to pin 40, is pulled downwardly together with finger 41 to the dotted line position of Figure 2 to uncage the gyro.

As has been pointed out in parent application Serial No. 465,499, above referred to, if the gyro rotor were spinning in a clockwise direction and finger 41 were turned in a counterclockwise direction to engage caging pin 18, the rotor would precess away from shaft 38 rather than toward the shaft. To insure that the shaft, as well as finger 41, will operate in a proper direction to cage the gyroscope which, with clockwise rotor spin, must be in a clockwise direction, a coil spring 64 is provided to surround shaft 27 so that the latter may be turned only in a clockwise direction by the actuating apparatus. Spring 64 is anchored at one end to flange 33 of sleeve 32 and is free at its other end so that it will remain free during clockwise rotation of shaft 27 but will wind and tighten itself about the shaft if counterclockwise rotation thereof were attempted. Should it become necessary for some reason to spin the gyro rotor in a counterclockwise direction, spring 64 must be reversed so that shaft 27 will be free to rotate in a counterclockwise but not in a clockwise direction. For a more detailed description of the structure and operation of the caging device itself reference is made to the parent application referred to hereinabove.

The novel apparatus of the present invention for automatically actuating the caging mechanism to cage the gyroscope in response to a predetermined tilt of the rotor relative to its support comprises an annular conductor ring 66 secured to and suitably insulated from bracket 16 (Figure 2) which is adapted for engagement with caging pin 18 upon the occurrence of the above-mentioned condition. The caging pin is formed of brass and may be silver plated so that it constitutes a good conductor adapted to close a circuit, to be presently described, when it engages the conductor ring. To this end pin 18 is preferably grounded by way of a lead 67. The conductor ring, likewise, is formed of brass provided with a silver coating and connects by way of a suitable conductor 68 (Figure 7) with a solenoid 69 having a plunger 70.

A suitable D. C. motor 71 drivably connects through a speed reduction gearing 72 and a flexible cable 73 with shaft 27 of the caging mechanism. The motor is provided with a suitable field winding 74 which is grounded at one end by virtue of a lead 75. A condenser 76 is connected to lead 77 to prevent sparking. The opposite end of the motor winding is electrically connected by way of a lead 77 with two pivoted spring contacts 78 and 79 which normally rest against a cam 80, which is driven from the motor during operation of the latter through a suitable connection 81.

Cam actuated contact 78 cooperates with a stationary contact 82 which connects by way of a conductor 83 with a pivoted contact element 84 while contact 79 is adapted for cooperation with a second stationary contact 85 which connects through a lead 86 with a second pivoted contact element 87.

The free ends of pivoted contact elements 84 and 87 are supported by an insulated block 88 which is secured to plunger 70 of the solenoid for longitudinal movement thereby. Furthermore, the block is engaged by a pivotally mounted actuating knob 89 which is provided with a "cage" and "uncage" position.

Solenoid 69 connects with a battery 90, grounded at one end, by way of a lead 91, a stationary contact 92 which cooperates with a pivoted contact element 93 and a lead 94. Pivoted contact 93, like contacts 84 and 87, has its free end secured to block 88. Cooperating with either contact element 84 or 87 is a stationary contact member 95 which connects with the battery by way of lead 94.

Considering now the operation of the foregoing described automatic caging device, it may be assumed, for purposes of clarity, that the gyro has been caged so that the rotor bearing case 10 is centered and caging pin 18 locked within aperture 44 of collar 42 in the manner illustrated in full in Figure 2. In this condition switch 89 is in the "cage" position of Figure 7, indicating such fact to the pilot, and cam 80 has caused engagement between contact 79, 85 while contacts 78, 82 remain open.

Assuming that the condition at which caging was desired is no longer present, the pilot manually moves knob 89 from the "cage" to the "uncage" position. In so doing block 88 is moved downwardly away from the solenoid so that pivoted contact element 93 engages contact 92 but since caging pin 18 and ring 66 are out of engagement the solenoid remains de-energized. At the same time contact element 84 leaves contact 95 and contact 87 engages contact 95. Since contacts 79, 85 are closed, the circuit to the motor is closed. This circuit can be traced from ground, through battery 90, lead 94, stationary contact 95, pivoted contact 87, lead 86, contacts 85, 79, lead 77 to one side of field winding 74, and lead 75 back to ground.

The motor, being energized, drives shaft 29 and worm wheel 35 of the caging mechanism so that cam 55, as viewed in Figure 5, moves to the left and away from shaft 38. The latter, under the influence of spring 65, is urged downwardly to carry finger 41 away from the rotor casing, to the dotted line position of Figure 2, and release caging pin 18 so that the gyro is uncaged. Simultaneously with the operation of shaft 29, the motor drives cam 80 through connection 81 and the cam rotates to the right until its high point passes contact element 79 whereupon the latter springs to the left against the low point of the cam to open the circuit and de-energize the motor. As contacts 79, 85 are opened the cam pivots contact 78 into engagement with contact 82, the latter two being the caging contacts.

Any craft deviation from normal flight such as, during pitch or bank thereof, demonstrates itself in a corresponding tilt of the instrument housing relative to the rotor bearing case 10. When the amount of such tilt reaches around 65°, caging pin 18 engages conductor ring 66. Solenoid 69 is immediately energized because contacts 92 and 93 are in engagement and this circuit can be traced from ground, lead 67, caging pin 18, conductor ring 66, lead 68, solenoid 69, lead 91, contacts 92, 93, lead 94, battery 90 and back to ground.

Plunger 70 of the solenoid is forced inwardly, moving block 88 therewith as well as knob 89 which is moved to "cage" position. At the same time pivoted contact 93 is moved away from contact 92 whereby solenoid 69 is de-energized but contact 87 has left stationary contact 95 while contact 84 has engaged the latter.

With contacts 84, 95 as well as contacts 78, 82 in engagement, the circuit across the motor is closed. This circuit may be traced from ground, through battery 90, lead 94, stationary contact 95, pivoted contact 84, lead 83, contacts 82, 78, lead 77, field winding 74, and back to ground by way of lead 75.

The motor drives shaft 29 and worm wheel 35 of the caging mechanism so that finger 41 is rotated about caging pin 18 by virtue of worm gear 36 and the pin and slot connection with shaft 38. At the same time, cam 55 is rotated from worm wheel 35 through gear 54, pinion 51 and gear 50 so that shaft 38 is raised as well as rotated. As soon as finger 41 engages pin 18 it causes the rotor to precess so that the pin moves downwardly along the finger until it passes into passage 46 of collar 42, depresses detent 48 and finally rests within aperture 44, at which time spring 47 urges the detent to the position of Figure 3 to lock the pin and cage the gyro.

When the condition causing gyro caging no longer exists, knob 89, as before is moved manually to its "uncage" position so that motor 71 is again energized, in the manner described above, to rotate cam 55 away from shaft 38 at which time spring 65 urges the shaft together with finger 41 downwardly to the uncaged dotted position of Figure 2.

Although but a single embodiment of the present invention has been illustrated and described in detail, it is to be expressly understood that the invention is not limited thereto. Various changes can be made in the design and arrangement of parts without departing from the spirit and scope of the invention as will now be understood by those skilled in the art. For a definition of the limits of the invention, reference will be had primarily to the appended claims.

We claim:

1. In a caging and centralizing device for a universally mounted gyroscope having a rotor mounted for spinning about one axis and means comprising a casing supporting the rotor for oscillation about two mutually perpendicular axes at right angles to said spin axis, the combination with the casing of means comprising an arcuate member rotatable about an axis coaxial with said spin axis for imposing a precessive torque on said rotor to cause a precession thereof to a normally central position where said casing becomes centered about said two mutually perpendicular axes, and automatic control means for actuating said rotatable member brought into operation by a predetermined tilt of said rotor with respect to its two mutually perpendicular axes of oscillation.

2. In a caging and centralizing device for a universally mounted gyroscope having a rotor mounted for spinning about one axis and means comprising a casing supporting the rotor for oscillation about two mutually perpendicular axes at right angles to said spin axis, the combination with the casing of a pin carried thereby, means comprising a finger rotatable about an axis coaxial with said spin axis for engaging said pin whereby said rotor is caused to precess along said finger to a normally central position to thereby centralize said casing, and automatic control means for actuating said finger brought into operation by a predetermined tilt of said rotor with respect to its two mutually perpendicular axes of oscillation.

3. In a caging and centralizing device for a universally mounted gyroscope having a rotor mounted for spinning about one axis and means comprising a casing supporting the rotor for oscillation about two mutually perpendicular axes at right angles to said spin axis, the combination with the casing of caging means therefor comprising a finger adapted for slidable movement toward and away from and for rotational movement relative to said casing, said finger being adapted for impressing a precessive torque on said rotor to cause precession thereof along said finger to a normally central position whereby said casing is centered, and automatic control means for actuating said finger brought into operation by a predetermined tilt of said rotor with respect to its two mutually perpendicular axes of oscillation.

4. In combination with a universally mounted gyroscope having a rotor mounted for spinning about one axis and means comprising a casing supporting the rotor for oscillation about two mutually perpendicular axes at right angles to said spin axis, a torque exerting member for centering said rotor about said two mutually perpendicular axes by causing said rotor to precess to a normally central position, and automatic control means for actuating said member brought into operation by a predetermined tilt of said rotor with respect to its two mutually perpendicular axes of oscillation.

5. In a caging and centralizing device for a universally mounted gyroscope comprising a rotor having a normally vertical spin axis and a rotor casing therefor together with an outer support mounting said casing for freedom about two mutually perpendicular axes, the combination with the casing of means rotatable about an axis coaxial with said spin axis for imposing a precessive torque on said rotor to cause precession thereof to a normally central position wherein said casing is centered about said two mutually perpendicular axes, and control means for actuating said last-named means brought into operation by a predetermined relative tilt of said casing and said support, said control means comprising a motor drivably connected to said rotatable means for rotation thereof and a switch actuated in response to said predetermined relative tilt of said casing for energizing said motor.

6. In a caging and centralizing device for a universally mounted gyroscope comprising a rotor having a normally vertical spin axis and a rotor casing therefor together with an outer support mounting said casing for freedom about two mutually perpendicular axes, the combination with the casing of means rotatable about an axis coaxial with said spin axis for imposing a precessive torque on said rotor to cause precession thereof to a normally central position wherein said casing is centered about said two mutually perpendicular axes, and automatic control means for actuating said rotatable means brought into operation by a predetermined tilt of said rotor with respect to said support, said control means comprising a circuit including a solenoid energized in response to said predetermined tilt of said rotor and a motor drivably connected to said rotatable means for rotation thereof and energized upon energization of said solenoid.

7. In a caging and centralizing device for a universally mounted gyroscope comprising a rotor having a normally vertical spin axis and a rotor casing therefor together with an outer support including a gimbal for mounting said casing for freedom about two mutually perpendicular axes, the combination with the casing of a pin carried thereby, a conductor element carried by said support and engaged by said pin in response to a predetermined relative tilt of said casing and said support, an automatically operated cage for imposing a precessive torque on said rotor to cause precession thereof to a normally central position wherein said casing is centered with respect to the support, and controlling means for actuating said cage brought into operation by said predetermined relative tilt of said casing and said support, said means comprising a normally open circuit containing said pin and conductor element and including a solenoid energized when said pin engages said element to close the circuit and driving means connected to said cage and energized upon energization of said solenoid.

8. In a caging and centralizing device for a universally mounted gyroscope comprising a rotor having a normally vertical spin axis and a rotor casing therefor together with an outer support including a gimbal for mounting said casing for freedom about two mutually perpendicular axes, the combination with the casing of a pin carried thereby, an annular conductor element carried by said support and engaged by said pin in response to a predetermined relative tilt of said casing and said support, an automatically operated cage for imposing a precessive torque on said rotor to cause precession thereof to a normally central position wherein said casing is centered with respect to the support, and controlling means for actuating said cage brought into operation by said predetermined relative tilt of said casing and said support, said means comprising a normally open circuit containing said pin and conductor element and including a solenoid energized when said pin engages said element to close the circuit and a motor drivably connected to said cage and energized upon energization of said solenoid.

9. In a gyro vertical having a rotor provided with a normally vertical spin axis and a rotor casing therefor, a gimbal ring supporting said casing for oscillation about a horizontal axis perpendicular to said spin axis, a housing supporting said gimbal ring and said casing for oscillation about a second horizontal axis mutually perpendicular to said first two axes, a caging pin mounted coaxially with said spin axis and secured to said casing, an annular conductor element carried by said housing and engaged by said pin in response to a predetermined relative tilt of said casing and said housing, a cage for engaging said pin to thereby cause precession of said rotor to a normally central position wherein said casing is centered with respect to said housing, and means for actuating said cage comprising an electrical circuit including said pin and conductor element energized in response to said predetermined relative tilt of said casing and said housing.

10. In a gyro vertical having a rotor provided with a normally vertical spin axis and a rotor casing therefor, a gimbal ring supporting said casing for oscillation about a horizontal axis perpendicular to said spin axis, a housing supporting said gimbal ring and said casing for oscillation about a second horizontal axis mutually perpendicular to said first two axes, a caging pin mounted coaxially with said spin axis and secured to said casing, an annular conductor element carried by said housing and engaged by said pin in response to a predetermined relative tilt of said casing and said housing, a cage for engaging said pin to thereby cause precession of said rotor to a normally central position wherein said casing is centered with respect to said housing, driving means connected with said cage, and means for actuating said driving means comprising an electrical circuit including said pin and conductor element energized in response to said predetermined relative tilt of said casing and said housing.

11. In a caging and centralizing device for a universally mounted gyroscope comprising a rotor mounted for spinning about one axis and means comprising a casing supporting the rotor for oscillation about two mutually perpendicular axes at right angles to said spin axis, the combination with the casing of means rotatable about an axis coaxial with said spin axis for imposing a precessive torque on said rotor to cause precession thereof to a normally central position wherein said casing is centered about said two mutually perpendicular axes, and control means for actuating said last-named means brought into operation by a predetermined tilt of said rotor relative to said support, said control means comprising a driving member connected to said rotatable means for rotation thereof and a switch actuated in response to said predetermined tilt of said rotor for energizing said driving member.

ALAN M. MACCALLUM.
PAUL A. NOXON.